United States Patent
Hara et al.

(10) Patent No.: US 12,282,191 B2
(45) Date of Patent: Apr. 22, 2025

(54) OPTICAL CIRCUIT ELEMENT

(71) Applicant: TDK CORPORATION, Tokyo (JP)

(72) Inventors: Hiroki Hara, Tokyo (JP); Takashi Kikukawa, Tokyo (JP); Atsushi Shimura, Tokyo (JP)

(73) Assignee: TDK CORPORATION, Tokyo (JP)

( * ) Notice: Subject to any disclaimer, the term of this patent is extended or adjusted under 35 U.S.C. 154(b) by 215 days.

(21) Appl. No.: 17/924,522

(22) PCT Filed: Aug. 19, 2021

(86) PCT No.: PCT/JP2021/030371
§ 371 (c)(1),
(2) Date: Nov. 10, 2022

(87) PCT Pub. No.: WO2022/070659
PCT Pub. Date: Apr. 7, 2022

(65) Prior Publication Data
US 2023/0228941 A1 Jul. 20, 2023

(30) Foreign Application Priority Data
Oct. 2, 2020 (JP) .................................. 2020-167655

(51) Int. Cl.
*G02B 6/125* (2006.01)
*G02B 6/12* (2006.01)

(52) U.S. Cl.
CPC ...... *G02B 6/125* (2013.01); *G02B 2006/1204* (2013.01); *G02B 2006/12061* (2013.01); *G02B 2006/12097* (2013.01)

(58) Field of Classification Search
None
See application file for complete search history.

(56) References Cited

U.S. PATENT DOCUMENTS

| | | | |
|---|---|---|---|
| 6,920,257 B1 * | 7/2005 | Mekis | G02B 6/122 |
| | | | 385/39 |
| 8,731,343 B2 * | 5/2014 | Pitwon | G02B 6/138 |
| | | | 385/132 |

(Continued)

FOREIGN PATENT DOCUMENTS

| | | | | |
|---|---|---|---|---|
| CN | 108061935 A | * | 5/2018 | ............ G02B 6/12 |
| JP | H11-052154 A | | 2/1999 | |

(Continued)

OTHER PUBLICATIONS

Nov. 16, 2021 International Search Report issued in Patent Application No. PCT/JP2021/030371.

*Primary Examiner* — Jerry Rahll
(74) *Attorney, Agent, or Firm* — Oliff PLC (57) ABSTRACT

An optical circuit element capable of preventing stray light propagated through a part including a substrate of the optical circuit element from being emitted to the outside is provided. The optical circuit element has a substrate, an optical waveguide layer that is formed on one surface of the substrate, and a protective layer that is overlaid on the optical waveguide layer. The optical waveguide layer has an optical waveguide configured for light to be propagated therethrough. A groove portion, which reaches to a position deeper than the one surface from a surface of the protective layer toward the substrate, is formed. The optical circuit element further includes a light absorption layer that covers at least a bottom surface and a side surface of the groove portion.

18 Claims, 7 Drawing Sheets

(56) References Cited

U.S. PATENT DOCUMENTS

| | | | |
|---|---|---|---|
| 8,816,376 B2* | 8/2014 | Ohno | H01L 33/0045 257/98 |
| 2004/0120633 A1* | 6/2004 | Gao | G02B 6/42 385/14 |
| 2006/0078024 A1* | 4/2006 | Matsumura | B82Y 20/00 372/46.014 |
| 2008/0044130 A1* | 2/2008 | Pitwon | G02B 6/122 385/14 |
| 2010/0085998 A1* | 4/2010 | Igarashi | H01S 5/22 372/50.1 |
| 2015/0192735 A1* | 7/2015 | Ellis-Monaghan | G02B 6/125 427/163.2 |

FOREIGN PATENT DOCUMENTS

| | | |
|---|---|---|
| JP | 2003-287777 A | 10/2003 |
| JP | 2010-135586 A | 6/2010 |
| JP | 2015-230466 A | 12/2015 |
| JP | 6369147 B2 | 8/2018 |
| WO | 2013/051095 A1 | 4/2013 |
| WO | 2019/111401 A1 | 6/2019 |

* cited by examiner

OPTICAL CIRCUIT ELEMENT

TECHNICAL FIELD

The present disclosure relates to an optical circuit element having an optical waveguide.

This application claims the benefit of priority from Japanese Patent Application No. 2020-167655, filed on Oct. 2, 2020, the content of which is incorporated herein.

BACKGROUND ART

The volume of communication has increased drastically with the spread of the Internet, and the importance of optical fiber communication has risen significantly. Optical fiber communication, in which an electrical signal is converted into an optical signal and the optical signal is transmitted through an optical fiber, is characterized by a wide band, a low loss, and resistance to noise.

Regarding methods for converting an electrical signal into an optical signal, a direct modulation method using a semiconductor laser and an external modulation method using an optical modulator are known. Since direct modulation requires no optical modulator, it can be performed at low cost but is inadequate for high-speed modulation. Therefore, an external optical modulation method is generally used for high-speed and long-distance application.

Regarding optical modulators, optical modulators in which an optical waveguide is formed near a surface of a lithium niobate single crystal substrate by titanium (Ti) diffusion have been put to practical use. Although high-speed optical modulators of 40 Gb/s or faster have been commercialized, they have a major flaw in having a long overall length around 10 cm.

In regard to this matter, Patent Document 1 discloses an optical waveguide element which has a waveguide constituted of a ridge portion having a ridge-shaped cross section, in which the ridge portion is constituted of a combination of a first part and a second part, which has a two-stage ridge structure having the first part formed on an upper surface of the second part, and in which a second ridge width is five times or greater than a first ridge width.

Although an optical waveguide element having such a constitution can be miniaturized, components of light which have not been coupled to an optical waveguide are likely to be generated due to miniaturization of the optical waveguide element during an alignment step in which optical axes are aligned between a light emitter for introducing light into the optical waveguide and an end portion of the optical waveguide. There is a problem that such components of light are propagated through parts other than the optical waveguide inside the optical waveguide element and are subjected to multiple reflection on an end surface, and then some of them are likely to generate so-called stray light which is input to a photodetector. Stray light which has propagated through the inside of the optical waveguide element hinders alignment of the photodetector and may cause increase in connection loss or poor connection. Particularly when visible light is used as a light source, the influence of stray light increases due to the reduced optical waveguide.

In regard to preventing such stray light inside an optical waveguide element from being emitted toward a photodetector, for example, Patent Document 2 discloses an optical integrated circuit element in which a groove portion penetrating an optical waveguide layer is provided at a position other than a waveguide portion guiding light and a side surface of this groove portion is inclined with respect to a surface perpendicular to an element surface. In this optical integrated circuit element disclosed in Patent Document 2, it is also disclosed that a substance for absorbing light propagated through the optical waveguide layer is formed such that at least the side surface of the groove portion is covered.

CITATION LIST

Patent Document

Patent Document 1

Japanese Patent No. 6369147

Patent Document 2

Japanese Unexamined Patent Application, First Publication No. H11-52154

SUMMARY OF INVENTION

Technical Problem

However, in the technology disclosed in Patent Document 2, since the groove portion for inhibiting stray light is formed above a surface of a substrate, although it is effective in blocking stray light propagated through a cladding layer, there is a problem that stray light propagated through the substrate cannot be inhibited.

The technology according to the present disclosure has been made in consideration of such circumstances, and an object thereof is to provide an optical circuit element capable of preventing stray light propagated through a part including a substrate of an optical circuit element from being emitted to the outside.

Solution to Problem

According to an aspect of the present disclosure, there is provided an optical circuit element including a substrate, an optical waveguide layer that is formed on one surface of the substrate, and a protective layer that is overlaid on the optical waveguide layer. The optical waveguide layer has an optical waveguide configured for light to be propagated therethrough. A groove portion, which reaches to a position deeper than the one surface from a surface of the protective layer toward the substrate, is formed. The optical circuit element further includes a light absorption layer that covers at least a bottom surface and a side surface of the groove portion.

Advantageous Effects of Invention

According to the technology of the present disclosure, it is possible to provide an optical circuit element capable of preventing stray light propagated through a part including a substrate of an optical circuit element from being emitted to the outside.

DESCRIPTION OF EMBODIMENTS

Hereinafter, optical circuit elements that are embodiments in which the present disclosure is applied will be described with reference to the drawings. The following embodiments are specifically described for better understanding of the gist of the invention and do not limit the present disclosure unless otherwise specified. In addition, in the drawings used in the following description, in order to make the features of the present disclosure easier to understand, main parts may be illustrated in an enlarged manner for the sake of convenience, and dimensional ratios or the like of each constituent element are not always the same as the actual values.

First Embodiment

Figure 1:
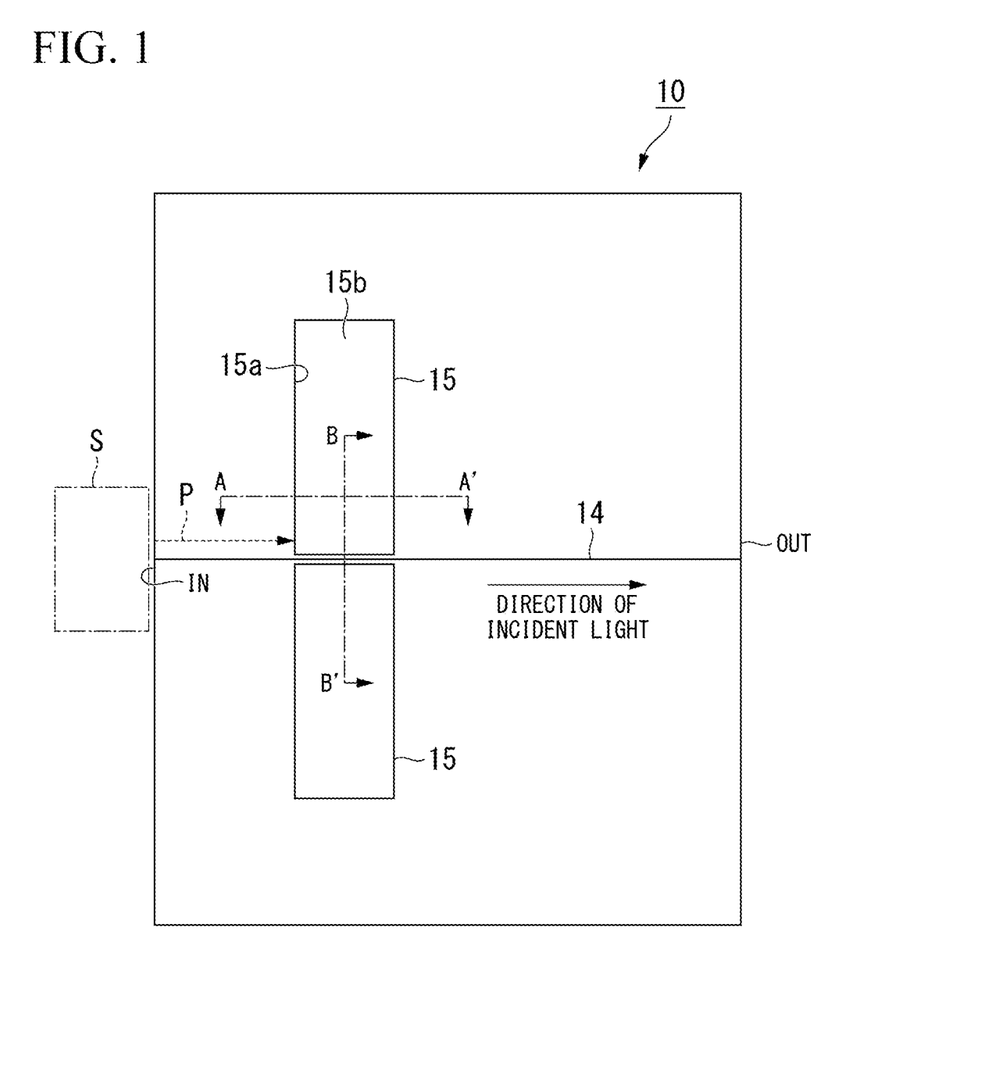
FIG. 1 is a plan view of an optical circuit element according to a first embodiment of the present invention when viewed from above.
Figure 2:
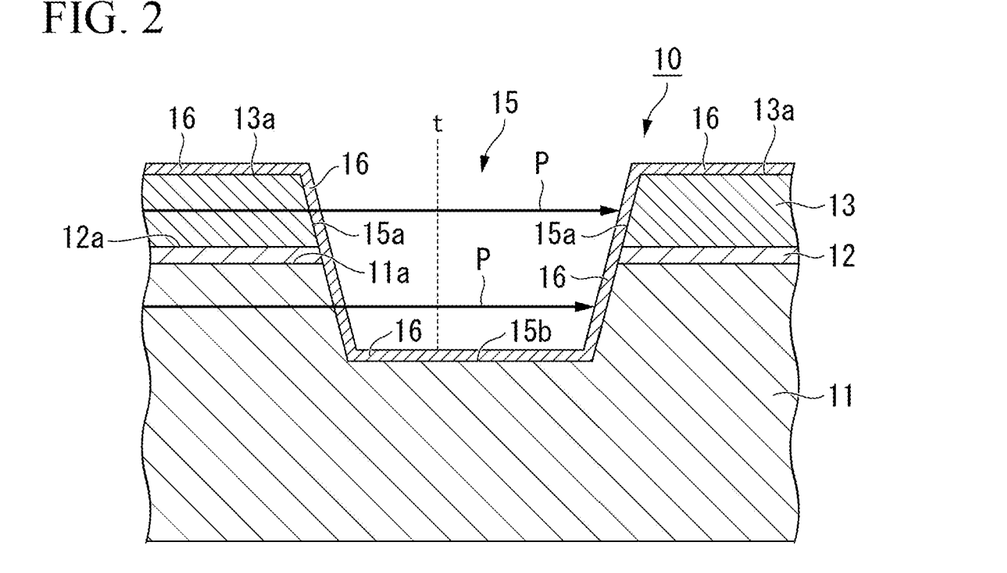
FIG. 2 is a cross-sectional view cut along line A-A' in FIG. 1.
Figure 3:
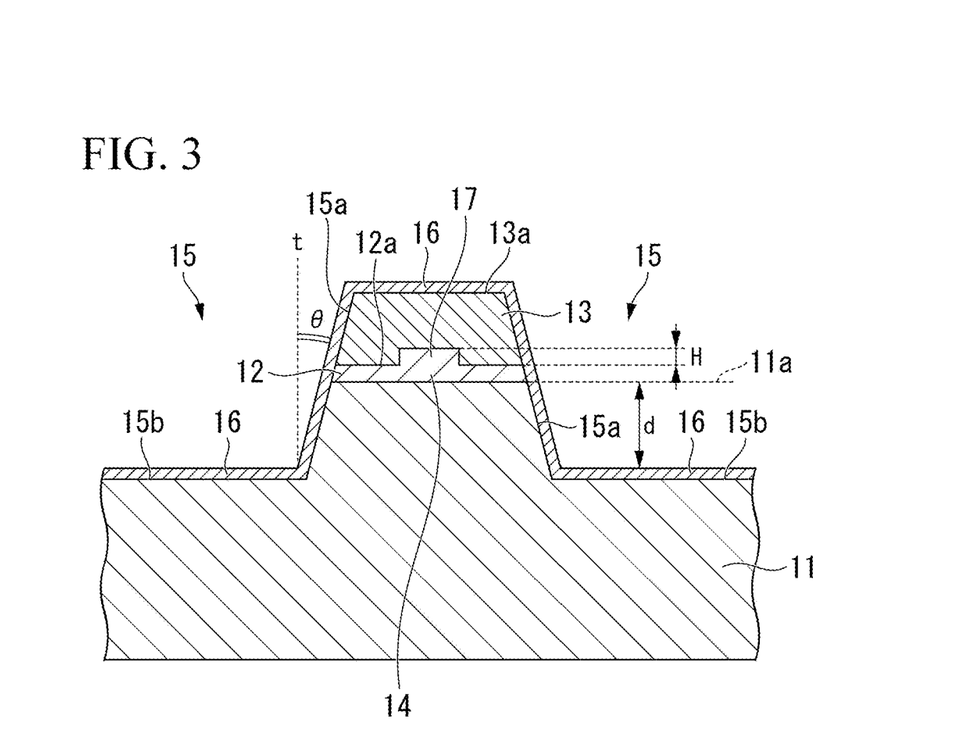
FIG. 3 is a cross-sectional view cut along line B-B' in FIG. 1.

FIG. 1 is a plan view of an optical circuit element according to a first embodiment of the present invention when viewed from above. FIG. 2 is a cross-sectional view cut along line A-A' in FIG. 1. FIG. 3 is a cross-sectional view cut along line B-B' in FIG. 1.

An optical circuit element 10 according to the first embodiment has an optical waveguide 14. For example, light incident from an input end portion IN of the optical waveguide 14 (incident light) is propagated through the optical waveguide 14 and then is emitted from an output end portion OUT (emission light). For example, a light source (light emitter) S need only be disposed close to the input end portion IN of the optical waveguide 14.

The optical circuit element 10 has a substrate 11, a waveguide layer 12 formed in a manner of overlapping one surface 11a of this substrate 11, and a protective layer 13 formed in a manner of overlapping this waveguide layer 12. The optical waveguide 14 including a ridge portion 17 of which a cross section has a ridge shape (projecting shape) is formed in the waveguide layer 12.

The ridge portion 17 protrudes from a surface 12a of the waveguide layer 12 and extends along the optical waveguide 14.

Such a ridge portion 17 need only be integrally formed of the same material as the waveguide layer 12, for example, lithium niobate ($LiNbO_3$).

Regarding a cross-sectional shape of the ridge portion 17, the shape is not limited as long as it is a shape capable of guiding light, and it may be a dome shape, a triangular shape, or a rectangular shape, for example. In the present embodiment, the optical waveguide 14 is formed in the waveguide layer 12 by the ridge portion 17. However, a constitution in which the optical waveguide 14 is formed in the waveguide layer 12 without particularly forming the ridge portion 17 protruding from the surface 12a of the waveguide layer 12 may be adopted. For example, the optical waveguide 14 having no ridge portion can also be formed in the waveguide layer 12 made of lithium niobate by doping titanium (Ti) or the like.

For example, it is preferable that the waveguide layer 12 be made using a lithium niobate ($LiNbO_3$) film. Lithium niobate has a large electro-optic constant and is a favorable material for constituting an optical device such as an optical modulator. Hereinafter, a constitution of the present invention in a case in which the waveguide layer 12 is a lithium niobate film will be described in detail.

The substrate 11 is not particularly limited as long as it has a lower refractive index than a lithium niobate film. However, it is preferable to adopt a substrate on which a lithium niobate film can be formed as an epitaxial film. As an example of the substrate 11, it is preferably a sapphire single crystal substrate or a silicon single crystal substrate. A crystal orientation of the single crystal substrate is not particularly limited.

A lithium niobate film constituting the waveguide layer 12 has properties of being easily formed as a c-axis-oriented epitaxial film with respect to the single crystal substrate having various crystal orientations. Since a c-axis-oriented lithium niobate film has three-fold symmetry, it is desired that the single crystal substrate (base material) also have the same symmetry. In the case of a sapphire single crystal substrate, a substrate of a c-plane is preferable, and in the case of a silicon single crystal substrate, a substrate of a (111) plane is preferable.

Here, an epitaxial film indicates a film in which orientations are aligned with respect to the crystal orientation of a substrate (base material) or a base film. When a plane within the film is regarded as an X-Y plane and a film thickness direction is regarded as a Z axis, crystals are oriented in a manner of being aligned together in an X axis direction, an Y axis direction, and a Z axis direction. For example, it is possible to confirm whether it is an epitaxial film by checking the peak intensity at an orientation position by 2θ-θ X-ray diffraction firstly and checking the pole secondly.

Specifically, when measurement by 2θ-θ X-ray diffraction is performed firstly, there is a need for all peak intensities other than that on a target surface to be equal to or less than 10% and preferably equal to or less than 5% of the maximum peak intensity of the target surface. For example, in a c-axis-oriented epitaxial film made of lithium niobate, the peak intensity other than that in a (00L) plane is equal to or less than 10% and preferably equal to or less than 5% of the maximum peak intensity of the (00L) plane. (00L) is generic expression of equivalent planes such as (001) and (002).

Second, in pole measurement, the pole needs to be seen. Conditions for checking the peak intensity at a first orientation position described above simply indicate orientations in one direction. Even if the first conditions described above are obtained, when the crystal orientations are not aligned within a plane, the X-ray intensity at a particular angular position does not increase and no pole is seen. Since lithium niobate has a crystal structure of a trigonal system, there are three poles of $LiNbO_3$ (014) in a single crystal. In the case of a lithium niobate film, it is known to epitaxially grow in a so-called twin crystal state in which crystals rotated about the c axis by 180° are symmetrically coupled. In this case, since two of three poles are in a symmetrically coupled state, there are six poles. In addition, when a lithium niobate film is formed on a silicon single crystal substrate of a (100) plane, since a substrate has four-fold symmetry, 12 poles (4×3) are observed. In the present embodiment, an epitaxial film also includes a lithium niobate film which has epitaxially grown in a twin crystal state.

The composition of a lithium niobate film constituting the waveguide layer 12 is $Li_xNb_AyO_z$. A expresses an element other than Li, Nb, and O. The factor x is 0.5 to 1.2 and preferably 0.9 to 1.05. The factor y is 0 to 0.5. The factor z is 1.5 to 4 and preferably 2.5 to 3.5. Regarding an element of A, there are K, Na, Rb, Cs, Be, Mg, Ca, Sr, Ba, Ti, Zr, Hf, V, Cr, Mo, W, Fe, Co, Ni, Zn, Sc, Ce, and the like, and two or more kinds thereof may be combined.

It is desired that the film thickness of a lithium niobate film constituting the waveguide layer 12 be 2 μm or smaller. If the film thickness further increases, there is concern that it may become difficult to form a high-quality film. When the film thickness of a lithium niobate film is excessively thin, there is concern that confinement of light in the lithium niobate film may be weakened and so-called stray light (light leaking to a substrate or a buffer layer) may increase. Even if an electric field is applied to a lithium niobate film, there is concern that change in effective refractive indices of optical waveguides (1a and 1b) may decrease. For this reason, it is desired that a lithium niobate film have a film thickness equal to or larger than approximately 1/10 of the wavelength of light used.

Regarding a method for forming a lithium niobate film constituting the waveguide layer 12, it is desired to utilize a film formation method such as a sputtering method, a CVD method, and a sol-gel method. The c axis is oriented in a manner of being perpendicular to a main surface of a single crystal substrate constituting the substrate 11, and an electric field is applied in a manner of being parallel to the c axis so that the optical refractive index changes in proportion to the electric field. When sapphire is used as a single crystal substrate constituting the substrate 11, a lithium niobate film can be directly subjected to epitaxial growth on a sapphire single crystal substrate.

When silicon is used as a single crystal substrate constituting the substrate 11, a lithium niobate film is formed by epitaxial growth with a cladding layer (not illustrated) therebetween. Regarding a cladding layer (not illustrated), a layer having a lower refractive index than a lithium niobate film and suitable for epitaxial growth is used. For example, if $Y_2O_3$ is used as a cladding layer (not illustrated), a high-quality lithium niobate film can be formed.

Regarding a method for forming a lithium niobate film constituting the waveguide layer 12, a method for thinly polishing a lithium niobate single crystal substrate is known. Although this method has an advantage of obtaining the same characteristics as a single crystal, it is difficult to process a thin film having a film thickness of 2 μm or smaller. As described above, in the present invention, since a lithium niobate film is formed by film formation, it is mass-producible and it is also easy to achieve increase in diameter.

The protective layer 13 covers an upper surface of the waveguide layer 12 including the ridge portion 17. A material of the protective layer 13 is not particularly limited. However, but a material having a refractive index lower than the refractive index of the waveguide layer 12, for example, silicon oxide ($SiO_2$) or aluminum oxide ($Al_2O_3$) can be used.

In addition to these, regarding the protective layer 13, for example, magnesium fluoride ($MgF_2$), lanthanum oxide ($La_2O_3$), zinc oxide (ZnO), hafnium oxide ($HfO_2$), magnesium oxide (MgO), yttrium oxide ($Y_2O_3$), calcium fluoride ($CaF_2$), indium oxide ($In_2O_3$), or the like, or a mixture of these can also be used.

The thickness of the protective layer 13 need only be approximately 0.2 to 1 μm, for example. In the present embodiment, the protective layer 13 covers the entire upper surface of the waveguide layer 12 but it may be patterning selectively covering only a part near the upper surface of the optical waveguide 14 formed in the waveguide layer 12.

Groove portions 15 are formed in the optical circuit element 10. In the present embodiment, the groove portions 15 are formed at parts on both sides of the optical waveguide 14 formed in the waveguide layer 12. The groove portions 15 of the present embodiment are formed to have a rectangular shape, for example, an oblong shape when one surface of the substrate is viewed in a plan view. In addition, the groove portions 15 are formed to have an inverted-trapezoidal cross-sectional shape of the optical circuit element 10 in a thickness direction (stacking direction) t, and side surfaces 15a of the groove portions 15 are formed to be inclined surfaces inclined with respect to the thickness direction t.

The groove portions 15 are formed to reach a position deeper than the one surface 11a of the substrate 11 toward the substrate 11 from a surface 13a of the protective layer 13. That is, bottom surfaces 15b of the groove portions 15 are formed at positions caved inside the substrate from the one surface 11a of the substrate 11, and the substrate 11 has a shape recessed in the thickness direction t at parts where these groove portions 15 are formed.

Figure 4:
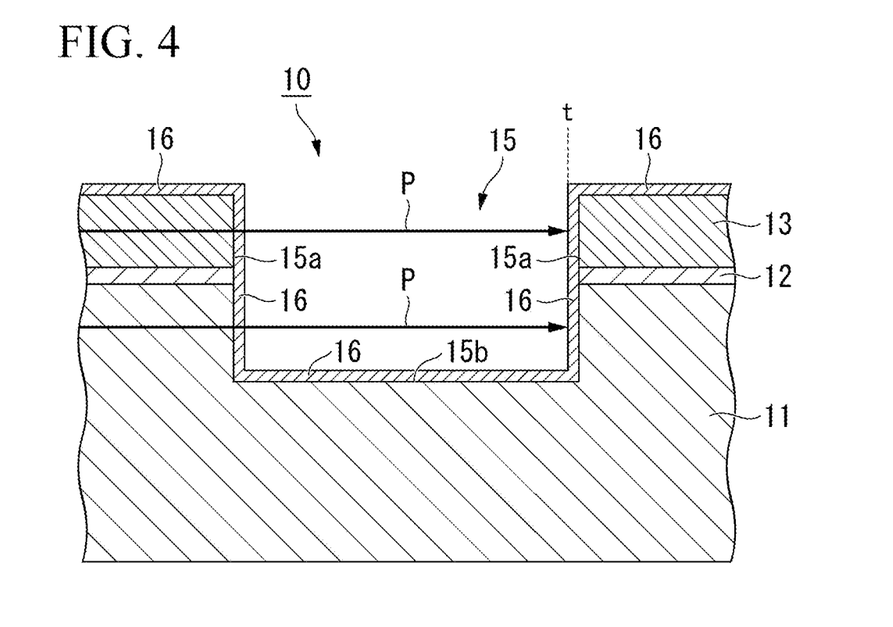
FIG. 4 is a cross-sectional view illustrating another example of a shape of a groove portion.

In the present embodiment, the side surfaces 15a of the groove portions 15 are inclined surfaces inclined at a predetermined inclination angle θ with respect to the thickness direction t. However, for example, as illustrated in FIG. 4, the groove portions 15 can also be formed to have a rectangular shape as a cross-sectional shape of the optical circuit element 10 in the thickness direction t so that the side surfaces 15a of the groove portions 15 are formed to be perpendicular surfaces in the thickness direction t.

Depths of the groove portions 15 at the substrate 11 parts caved in along the thickness direction t from the one surface 11a of the substrate 11, that is, gaps d between the one surface 11a of the substrate 11 and the bottom surfaces of the groove portions 15 may be set in accordance with the wavelength of light propagated through the optical waveguide 14. That is, the gaps d may be set to be equal to or larger than half the wavelength of light propagated through the optical waveguide 14. For example, when the wavelength of light propagated through the optical waveguide 14 is 520 nm, the groove portions 15 may be formed such that the gaps d become equal to or larger than 260 nm.

Between such two groove portions 15, the substrate 11, the waveguide layer 12 in which the optical waveguide 14 is formed in the ridge portion 17, and the protective layer 13 are formed such that they extend in a dam shape with a narrow width from the bottom surface 15b of the groove portion 15.

A light absorption layer 16 covering the bottom surface 15b and the side surface 15a of the groove portion 15 is formed in this groove portion 15. In the present embodiment, the light absorption layer 16 is formed to not only cover the bottom surface 15b and the side surface 15a of the groove portion 15 but also cover the surface 13a of the protective layer 13. The light absorption layer 16 may have a structure not covering the surface 13a of the protective layer 13.

The light absorption layer 16 is constituted using a material absorbing light propagated through the optical waveguide 14. A material for constituting the light absorption layer 16 is selected in accordance with the wavelength of light propagated through the optical waveguide 14. For example, when light propagated through the optical waveguide 14 is visible light, it is possible to use a material capable of absorbing and blocking light in a visible wavelength range, for example, a resin material including a visible light absorbing dye such as C, Si, Ge, a cyanine compound, an azo compound, a diphenylmethane compounds, or a triphenylmethane compound; a semiconductor such as In or Ga; oxide or nitride consisting of Ti, Ni, Cr, Fe, Nb, Ta, Zn, W, or Mo, or an alloy of these; or the like. In addition, for example, when light propagated through the optical waveguide 14 is infrared light, it is possible to use a material capable of absorbing and blocking light in an infrared wavelength range, for example, a resin material or the like including an infrared light absorbing dye such as a cyanine compound, a dimonium compound, or a squarylium compound.

The light absorption layer 16 need only be formed to have a thickness, for example, capable of absorbing 50% or more of stray light P incident on the light absorption layer 16. Accordingly, the stray light P is absorbed while passing through the light absorption layer 16 formed on one side surface 15a of the groove portion 15 and the light absorption layer 16 formed on the other side surface 15a.

Figure 5:
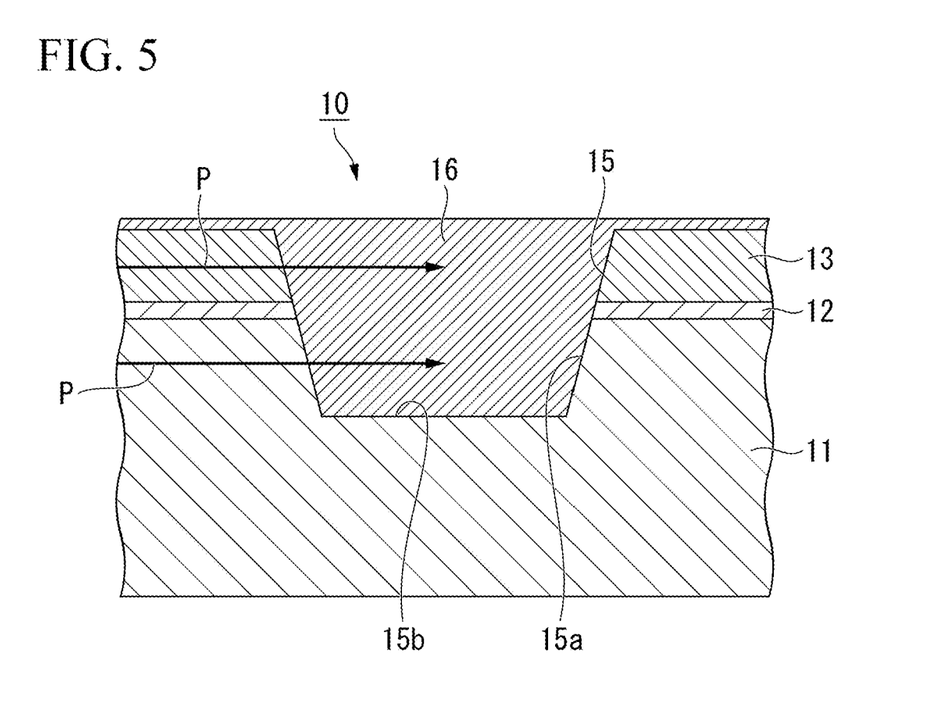
FIG. 5 is a cross-sectional view illustrating another formation example of a light absorption layer.

As in the present embodiment, the light absorption layer 16 can also be formed as illustrated in FIG. 5, for example, in addition to being formed on the bottom surface 15b and the side surface 15a of the groove portion 15 with a predetermined thickness. In FIG. 5, the light absorption layer 16 is formed such that the entire groove portion 15 including the bottom surface 15b and the side surface 15a is filled therewith. Due to such a constitution, the stray light P can be more reliably absorbed.

According to the optical circuit element 10 of the first embodiment having such a constitution, for example, during an alignment step in which optical axes are aligned between the light source (light emitter) S introducing light into the optical waveguide 14 and the input end portion IN of the optical waveguide 14, a component of light which is not coupled to the optical waveguide 14 may be generated. Such a component of light which is not coupled to the optical waveguide 14 becomes the stray light P propagated through parts other than the optical waveguide 14 inside the optical circuit element 10, for example, a part near the one surface 11a side of the substrate 11 and the protective layer 13. In the optical circuit element 10 of the present embodiment, if such stray light P reaches a formation position of the groove portion 15, the stray light P is absorbed by the light absorption layer 16.

Particularly, since the groove portions 15 are formed at positions deeper than the one surface 11a of the substrate 11 in the thickness direction t, the stray light P propagated through a part near the one surface 11a side of the substrate 11 are reliably absorbed by the light absorption layers 16 formed therein.

Since the stray light P is absorbed and blocked by such groove portions 15 and the light absorption layers 16 formed in these groove portions 15, the stray light P is not input to a photodetector (not illustrated) disposed in the output end portion OUT of the optical waveguide 14. Accordingly, in the alignment step, it is possible to prevent hindrance to alignment of the photodetector and occurrence of increase in connection loss and poor connection.

The stray light P can also be blocked by appropriately setting the inclination angles θ of the side surfaces 15a of the groove portions 15. For example, in a case in which the stray light P is incident toward a space of the groove portion 15 (air layer) from the protective layer 13, if the refractive index of air is 1 and the refractive index of the protective layer 13 is approximately 3.5, when the incident angle of the stray light P in an interface between the protective layer 13 and air is approximately 15° or larger, total reflection occurs in the interface due to the difference between the refractive indices thereof. The incident angle of the stray light P with respect to the side surface 15a of the groove portion 15 becomes 15° or larger when the inclination angle θ of the side surface 15a is +15° or larger. At this time, the reflection coefficient of the stray light P becomes 100%, and the stray light P is completely emitted to the upper side or the lower side of the optical circuit element 10 and is eliminated.

Second Embodiment

Next, an optical circuit element of a second embodiment of the present invention will be described. In the following embodiment, the same numbers are applied to constitutions similar to those of the first embodiment described above, and duplicate description thereof will be omitted.

Figure 6:
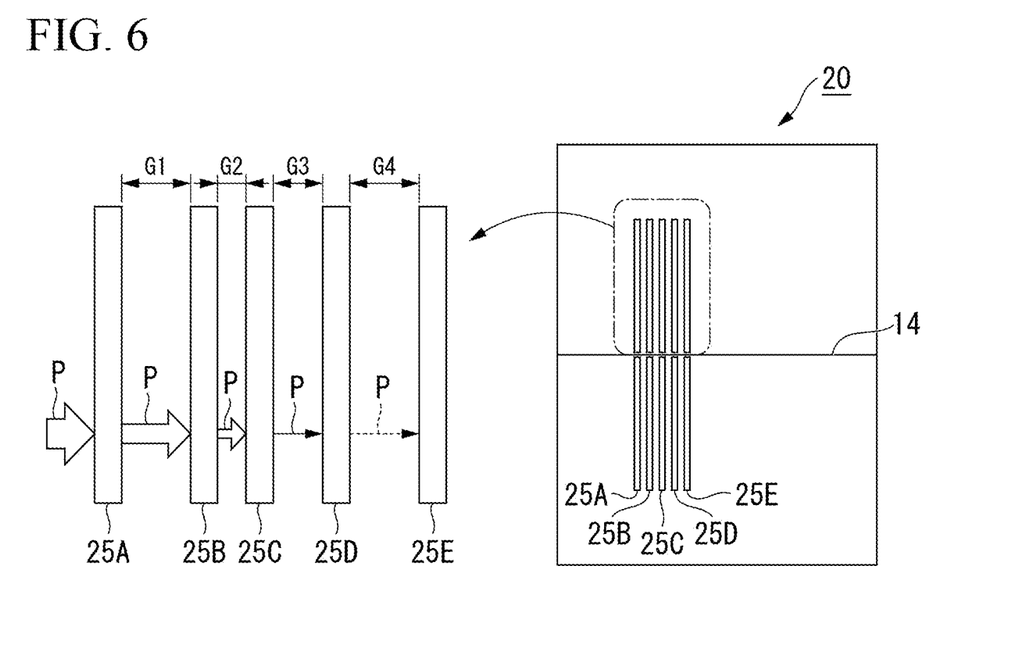
FIG. 6 is a plan view of an optical circuit element according to a second embodiment of the present invention when viewed from above.

FIG. 6 is a plan view of the optical circuit element according to the second embodiment of the present invention when viewed from above.

In an optical circuit element 20 of the present embodiment, a plurality of groove portions (five in the present embodiment) 25A, 25B, 25C, 25D, and 25E are formed on each of both sides of the optical waveguide 14 in an extending direction of the optical waveguide 14 with a space therebetween. Each of the groove portions 25A to 25E is formed to have the same rectangular shape (oblong shape) as each other when the one surface 11a of the substrate 11 (refer to FIG. 2) is viewed in a plan view.

In this embodiment, the groove portions 25A to 25E are formed such that all a gap G1 between the groove portion 25A and the groove portion 25B, a gap G2 between the groove portion 25B and the groove portion 25C, a gap G3 between the groove portion 25C and the groove portion 25D, and a gap G4 between the groove portion 25D and the groove portion 25E differ from each other.

Furthermore, the groove portions are formed such that the sum of the gap between arbitrary groove portions of the groove portions 25A to 25E differs from the sum of the gap between different arbitrary groove portions of the groove portions 25A to 25E. For example, the value of the sum of the gap G1 and the gap G3 differs from that of the gap G2 and the gap G4. In addition, for example, the value of the sum of the gap G2, the gap G3, and the gap G4 differs from that of the gap G1, the gap G3, and the gap G4.

If the plurality of groove portions 25A to 25E are regularly arranged at equal gaps therebetween, there is concern that reflected stray light may be regularly intensified. However, stray light can be prevented from being regularly reflected and synergically intensified by varying the gap between groove portions of the groove portions 25A to 25E adjacent to each other as in the present embodiment, and the stray light P can be reliably absorbed and blocked by the plurality of groove portions 25A to 25E and the light absorption layer 16 covering these.

Third Embodiment

Next, an optical circuit element of a third embodiment of the present invention will be described. In the following embodiment, the same numbers are applied to constitutions similar to those of the first embodiment described above, and duplicate description thereof will be omitted.

Figure 7:
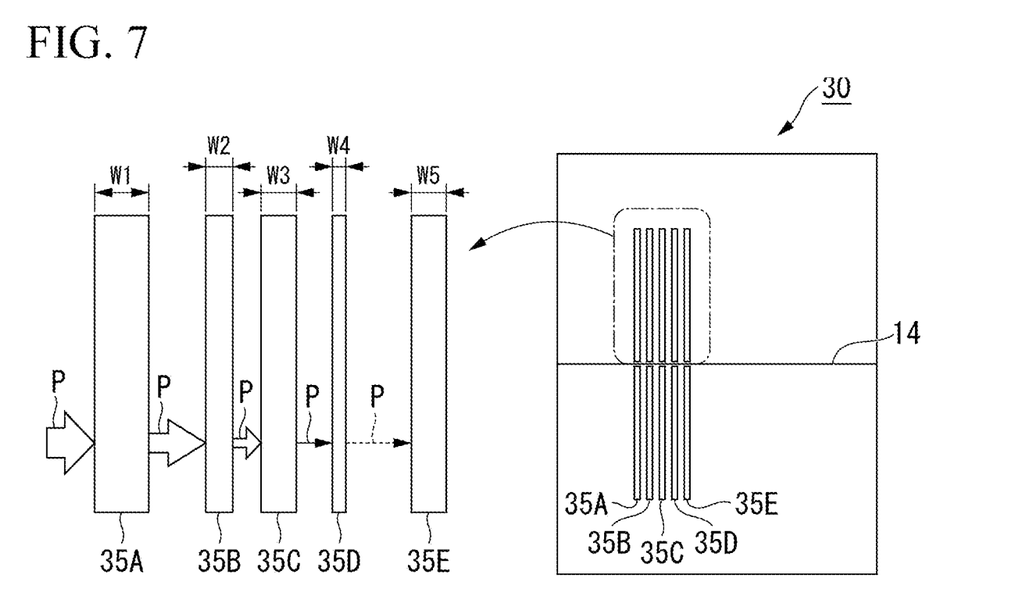
FIG. 7 is a plan view of an optical circuit element according to a third embodiment of the present invention when viewed from above.

FIG. 7 is a plan view of the optical circuit element according to the third embodiment of the present invention when viewed from above.

In an optical circuit element 30 of the present embodiment, a plurality of groove portions (five in the present embodiment) 35A, 35B, 35C, 35D, and 35E are formed on each of both sides of the optical waveguide 14 in the extending direction of the optical waveguide 14 with a space therebetween. Each of the groove portions 25A to 25E is formed to have a rectangular shape (oblong shape) when the one surface 11a of the substrate 11 (refer to FIG. 2) is viewed in a plan view.

In this embodiment, the groove portions 35A to 35E are formed such that all widths W1 to W5 of the groove portions 35A to the groove portions 35E in the extending direction of the optical waveguide 14 differ from each other.

Furthermore, the groove portions 35A to 35E are formed such that the sum of the widths of the widths W1 to W5 of arbitrary groove portions of the groove portions 35A to 35E differs from the sum of the widths of the widths W1 to W5 of different arbitrary groove portions of the groove portions 35A to 35E. For example, the value of the sum of the width W1 and the width W3 differs from that of the width W2 and the width W4. In addition, for example, the value of the sum of the width W1, the width W3, and the width W5 differs from that of the width W1, the width W2, and the width W4.

If the widths of the plurality of groove portions 35A to 35E are equivalent to each other, there is concern that stray light may be regularly reflected and intensified. However, stray light can be prevented from being regularly reflected and synergically intensified by varying the widths of the groove portions 35A to 35E adjacent to each other as in the present embodiment, and the stray light P can be reliably absorbed and blocked by the plurality of groove portions 35A to 35E and the light absorption layer 16 covering these.

Fourth Embodiment

Next, an optical circuit element of a fourth embodiment of the present invention will be described. In the following embodiment, the same numbers are applied to constitutions similar to those of the first embodiment described above, and duplicate description thereof will be omitted.

Figure 8:
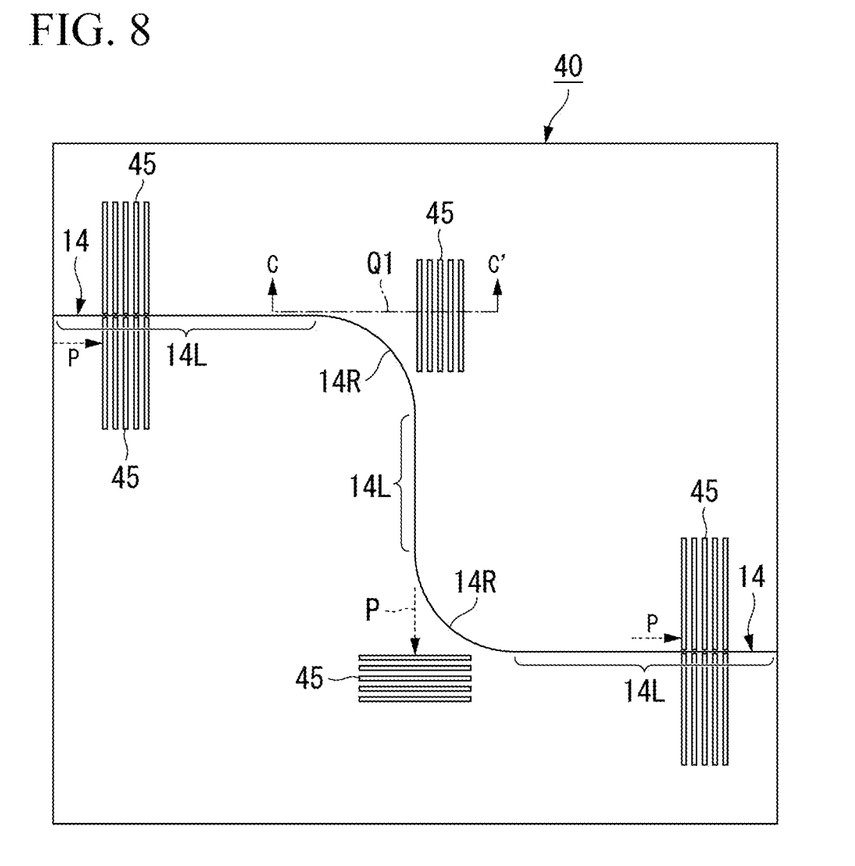
FIG. 8 is a plan view of an optical circuit element according to a fourth embodiment of the present invention when viewed from above.
Figure 9:
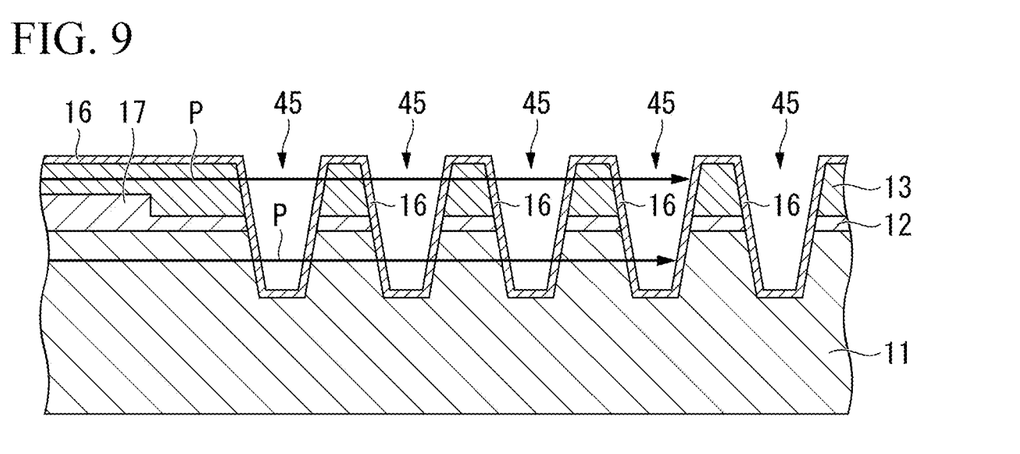
FIG. 9 is a cross-sectional view cut along line C-C' in FIG. 8.

FIG. 8 is a plan view of an optical circuit element according to the fourth embodiment of the present invention when viewed from above. FIG. 9 is a cross-sectional view cut along line C-C' in FIG. 8.

In an optical circuit element 40 of the present embodiment, the optical waveguide 14 is constituted of straight portions 14L extending in a straight shape, and curved portions 14R curved from these straight portions 14L.

Further, in the straight portions 14L at two locations, a plurality of groove portions 45, 45, and so on are formed across both sides of each of the straight portions 14L, and the inner surfaces (side surfaces and bottom surfaces) of these groove portions 45 are covered by the light absorption layer 16.

Moreover, a plurality of groove portions 45, 45, and so on are also formed on a virtual extension line Q1 of a straight portion L1 extending in a direction branching off from the curve direction of the curved portion 14R at a connection part between the straight portion L1 of the optical waveguide 14 and the curved portion 14R, and the inner surfaces (side surfaces and bottom surfaces) of these groove portions 45 are covered by the light absorption layer 16.

According to the optical circuit element 40 having such a constitution, when light propagated through the optical waveguide 14 enters the curved portion 14R from the straight portion L1, the light is curved along this curved portion 14R. In contrast, the stray light P propagated through the substrate 11 or the protective layer 13 travels forward as it is without being curved at the formation position of the curved portion 14R. Further, this stray light P which has traveled forward is absorbed by the plurality of groove portions 45, 45, and so on formed on the virtual extension line Q1 of the straight portion L1 and the light absorption layer 16 covering these. Therefore, according to the optical circuit element 40 of the present embodiment, the stray light P which has traveled forward at the formation position of the curved portions 14R of the optical waveguide 14 is not emitted to the outside of the optical circuit element 40, and for example, in the alignment step, it is possible to prevent hindrance to alignment of the photodetector and occurrence of increase in connection loss and poor connection.

Fifth Embodiment

Next, an optical circuit element of a fifth embodiment of the present invention will be described. In the following embodiment, the same numbers are applied to constitutions similar to those of the fourth embodiment described above, and duplicate description thereof will be omitted.

Figure 10:
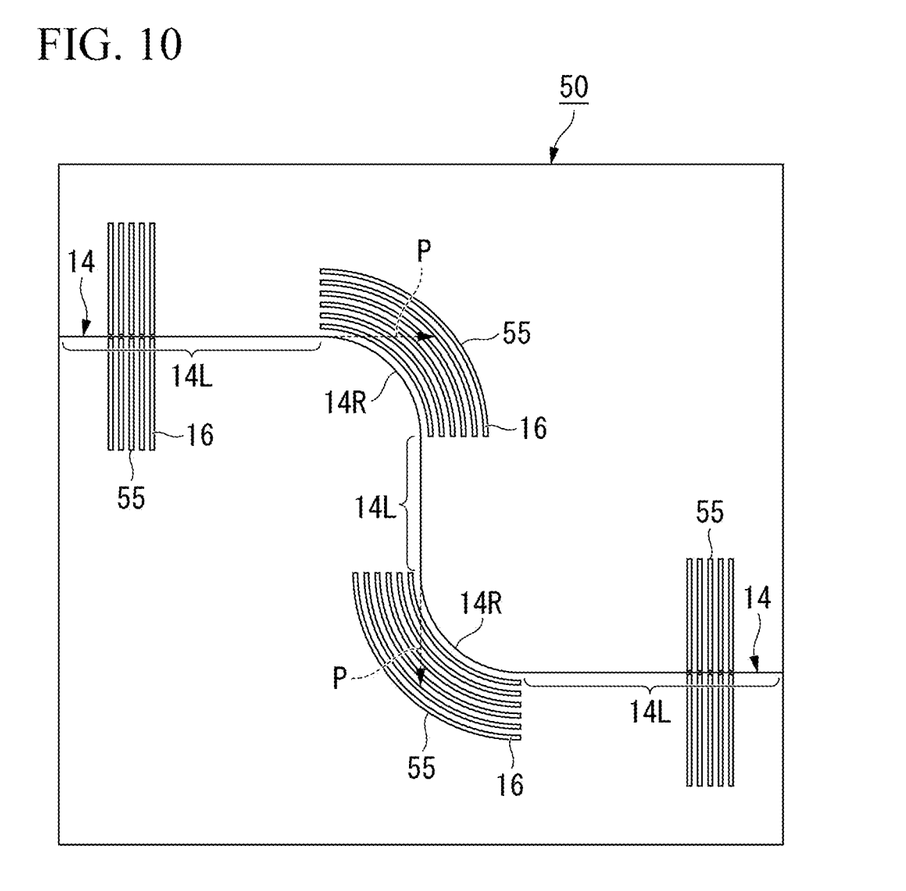
FIG. 10 is a plan view of an optical circuit element according to a fifth embodiment of the present invention when viewed from above.

FIG. 10 is a plan view of the optical circuit element according to the fifth embodiment of the present invention when viewed from above.

In an optical circuit element 50 of the present embodiment, the optical waveguide 14 is constituted of the straight portions 14L extending in a straight shape, and the curved portions 14R curved from these straight portions 14L.

Further, in the straight portions 14L at two locations, a plurality of groove portions 45, 45, and so on are formed across both sides of each of the straight portions 14L, and the inner surfaces (side surfaces and bottom surfaces) of these groove portion 45 are covered by the light absorption layer 16.

Moreover, a plurality of curved groove portions 55, 55, and so on are formed along the curved outer circumferences of the curved portions 14R of the optical waveguide 14, and the inner surfaces (side surfaces and bottom surfaces) of these groove portions 55 are covered by the light absorption layer 16.

According to the optical circuit element 50 having such a constitution, when light propagated through the optical waveguide 14 enters the curved portion 14R from the straight portion L1, the light is curved along this curved portion 14R. In contrast, the stray light P propagated through the substrate 11 or the protective layer 13 travels forward as it is without being curved at the formation position of the curved portion 14R. Further, this stray light P which has traveled forward is absorbed by the plurality of curved groove portions 55, 55, and so on formed along the curved outer circumferences of the curved portions 14R and the light absorption layer 16 covering these.

As an example, according to the constitution of the present embodiment, for example, when the wavelength of light being incident on the optical waveguide 14 is set to 520 nm and the light absorption layer 16 is formed using a Si film, since the light absorption coefficient of Si is $1.35 \times 10^5$ cm$^{-1}$, even if the thickness of the light absorption layer 16 is 100 nm, five groove portions 55 are arranged so that stray light can be attenuated up to approximately 26% of the intensity before being incident thereon while the stray light is transmitted through all the light absorption layer 16 formed in each of the five groove portions 55.

Therefore, according to the optical circuit element 50 of the present embodiment, the stray light P which has traveled forward at the formation position of the curved portions 14R of the optical waveguide 14 is not emitted to the outside of the optical circuit element 40, and for example, in the alignment step, it is possible to prevent hindrance to alignment of the photodetector and occurrence of increase in connection loss and poor connection.

Sixth Embodiment

Next, an optical circuit element of a sixth embodiment of the present invention will be described. In the following embodiment, the same numbers are applied to constitutions similar to those of the first embodiment described above, and duplicate description thereof will be omitted. In the present embodiment, a Mach-Zehnder-type optical modulator will be described as an example of the optical circuit element.

Figure 11:
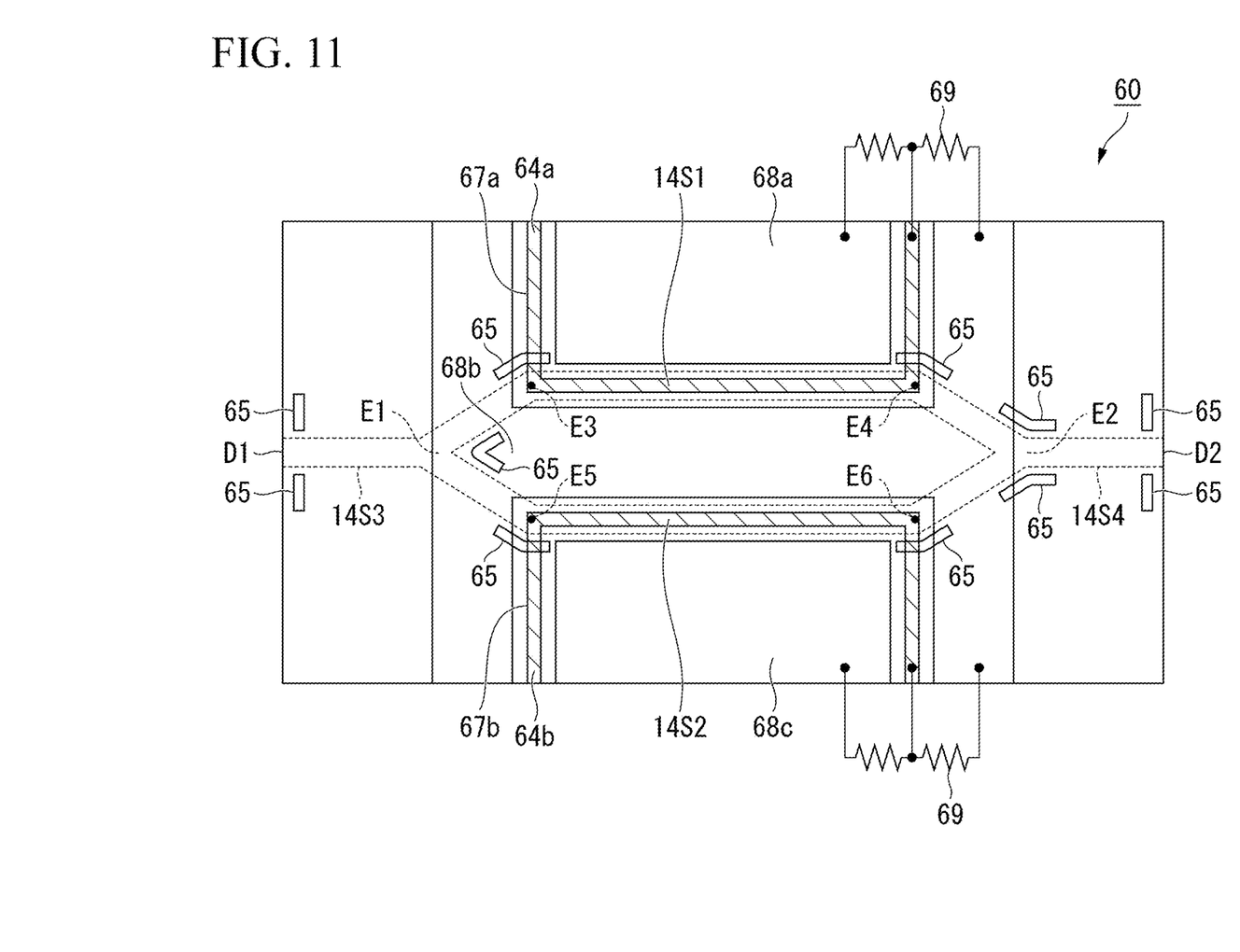
FIG. 11 is a plan view illustrating a Mach-Zehnder-type optical modulator (optical circuit element) according to a sixth embodiment of the present invention.

FIG. 11 is a plan view illustrating a Mach-Zehnder-type optical modulator (optical circuit element) according to the sixth embodiment of the present invention.

An optical modulator (optical circuit element) 60 is a device for modulating light propagated through the inside of the optical waveguide 14 by applying a voltage to a Mach-Zehnder interferometer formed using the optical waveguide 14. The optical waveguide 14 branches into two optical waveguides 14S1 and 14S2 at branch portions E1 and E2 and has a dual electrode structure in which respective, that is, two first electrodes 67a and 67b are respectively provided in the optical waveguides 14S1 and 14S2.

Such an optical modulator 60 functions as a traveling wave electrode in which two first electrodes 67a and 67b and second electrodes 68a, 68b, and 68c are connected to each other via terminal resistors 69. The second electrodes 68a, 68b, and 68c serve as ground electrodes, and so-called complementary signals which have the same absolute value with respect to the two first electrodes 67a and 67b and are shifted in positive and negative phases are input from input sides 64a and 64b of the first electrodes 67a and 67b of the optical modulator 60. Since a lithium niobate film constituting a substrate has an electro-optic effect, the refractive index of each of the optical waveguides (14S1 and 14S2) changes such as +Δn and −Δn due to an electric field applied to the optical waveguides 14S1 and 14S2, and the phase difference between the optical waveguides (14S1 and 14S2) changes. An intensity-modulated signal light is output from an optical waveguide 14S4 on an output side D2 of the optical modulator 60 due to change in this phase difference.

In the optical modulator 60 having such a constitution, each of groove portions 65, 65, and so on is formed on both sides of an optical waveguide 14S3 on an input side D1, both sides of the optical waveguide 14S4 on the output side D2, the inward side of the branch portion E1, the outward side of the branch portion E2, the outward sides of bent portions E3 and E4 of an optical waveguide 14S1, and the outward sides of bent portions E5 and E6 of an optical waveguide 14S2. In addition, the inner surfaces (side surfaces and bottom surfaces) of these groove portions 65, 65, and so on are covered by a light absorption layer (not illustrated).

Due to such a constitution, stray light generated in each portion of the optical waveguides 14S1 to 14S4 of the optical modulator 60 is absorbed and blocked by the groove portions 65, 65, and so on and the light absorption layer. Thus, stray light is not emitted to the outside of the optical modulator 60, and erroneous operation due to light other than a signal light (stray light) can be prevented.

Constitution Example

As a constitution example, there is provided an optical circuit element including a substrate, an optical waveguide layer that is formed on one surface of the substrate, and a protective layer that is overlaid on the optical waveguide layer. The optical waveguide layer has an optical waveguide configured for light to be propagated therethrough. A groove portion, which reaches to a position deeper than the one surface from a surface of the protective layer toward the substrate, is formed. The optical circuit element further includes a light absorption layer that covers at least a bottom surface and a side surface of the groove portion.

As a constitution example, the light absorption layer may be formed such that the entire groove portion is filled therewith.

As a constitution example, regarding the groove portion, a plurality of groove portions may be formed separated from each other along one surface of the substrate.

As a constitution example, regarding the groove portions, three or more groove portions may be formed in a manner of extending substantially parallel to each other. The groove portions may be formed such that a gap between arbitrary adjacent groove portions of the groove portions differs from a gap between different arbitrary adjacent groove portions of the groove portions.

As a constitution example, regarding the groove portions, four or more groove portions may be formed in a manner of extending substantially parallel to each other. The groove portion may be formed such that a sum of the gap between arbitrary groove portions of the groove portions differs from a sum of the gap between different arbitrary groove portions of the groove portions.

As a constitution example, the groove portions may be formed such that a width of an arbitrary groove portions of the groove portions differs from a width of an adjacent groove portion of the groove portions.

As a constitution example, regarding the groove portions, three or more groove portions may be formed in a manner of extending substantially parallel to each other. The groove portions may be formed such that a sum of widths of arbitrary groove portions of the groove portions differs from a sum of widths of different arbitrary groove portions of the groove portions.

As a constitution example, the optical waveguide may have a curved portion curved from a straight portion, and the groove portions may be disposed in a manner of intersecting a virtual extension line of the straight portion.

As a constitution example, the optical waveguide may have a curved portion curved from a straight portion, and the groove portions may be formed in a manner of being curved and extending along the curved portion.

As a constitution example, the optical waveguide layer may include lithium niobate.

As a constitution example, the optical waveguide may be a ridge type.

As a constitution example, the light absorption layer may be formed of Si.

Hereinabove, embodiments of the technology according to the present disclosure have been described, but these embodiments have been presented as examples and are not intended to limit the scope of the invention. These embodiments can be performed in various other forms, and various omissions, replacements, and changes can be made within a range not departing from the gist of the invention. These embodiments and modifications thereof are included in the invention described in the claims and the scope equivalent thereto as they are included in the scope and the gist of the invention.

REFERENCE SIGNS LIST

10 Optical circuit element
11 Substrate
12 Waveguide layer
13 Protective layer
14 Optical waveguide
15 Groove portion
15a Side surface
15b Bottom surface
16 Light absorption layer
17 Ridge portion

The invention claimed is:

1. An optical circuit element comprising:
a substrate;
an optical waveguide layer that is formed on one surface of the substrate; and
a protective layer that is overlaid on the optical waveguide layer,
wherein the optical waveguide layer has an optical waveguide configured for light to be propagated therethrough,
wherein three or more groove portions, each of which reaches to a position deeper than the one surface of the substrate from a surface of the protective layer toward the substrate, are formed in a manner of extending substantially parallel to each other,
the optical circuit element further comprises a light absorption layer that covers at least a bottom surface and a side surface of at least one of the groove portions,
the groove portions are formed separated from each other along the one surface of the substrate, ends of the groove portions being aligned on a virtual straight line as viewed in a direction perpendicular to a lamination direction,
the groove portions are formed such that a gap between arbitrary adjacent groove portions among the groove portions differs from a gap between different arbitrary adjacent groove portions among the groove portions,
a gap d between the one surface of the substrate and a bottom surface of each of the groove portions is equal to or larger than half a wavelength of the light to be propagated through the optical waveguide, and
the optical waveguide layer includes lithium niobate.

2. The optical circuit element according to claim 1, wherein the light absorption layer is formed such that the entirety of at least one of the groove portions is filled therewith.

3. The optical circuit element according to claim 1, wherein regarding the groove portions, four or more groove portions are formed in a manner of extending substantially parallel to each other, and wherein the groove portions are formed such that a sum of the gap between arbitrary groove portions of the groove portions differs from a sum of the gap between different arbitrary groove portions of the groove portions.

4. The optical circuit element according to claim 1, wherein the groove portions are formed such that a width of an arbitrary groove portion of the groove portions differs from a width of an adjacent groove portion of the groove portions.

5. The optical circuit element according to claim 4, wherein regarding the groove portions, three or more groove portions are formed in a manner of extending substantially parallel to each other, and
wherein the groove portions are formed such that a sum of widths of arbitrary groove portions of the groove portions differs from a sum of widths of different arbitrary groove portions of the groove portions.

6. The optical circuit element according to claim 1, wherein the optical waveguide has a curved portion curved from a straight portion, and the groove portions are disposed in a manner of intersecting a virtual extension line of the straight portion.

7. The optical circuit element according to claim 1, wherein the optical waveguide has a curved portion curved from a straight portion, and the groove portions are formed in a manner of being curved and extending along the curved portion.

8. The optical circuit element according to claim 1, wherein the optical waveguide layer includes lithium niobate.

9. The optical circuit element according to claim 1, wherein the optical waveguide is a ridge type.

10. The optical circuit element according to claim 1, wherein the light absorption layer is formed of Si.

11. An optical circuit element comprising:
a substrate;
an optical waveguide layer that is formed on one surface of the substrate; and
a protective layer that is overlaid on the optical waveguide layer,
wherein the optical waveguide layer has an optical waveguide configured for light to be propagated therethrough,
wherein three or more groove portions, each of which reaches to a position deeper than the one surface of the substrate from a surface of the protective layer toward the substrate, are formed in a manner of extending substantially parallel to each other,
the optical circuit element further comprises a light absorption layer that covers at least a bottom surface and a side surface of at least one of the groove portions,
the groove portions are formed separated from each other along one surface of the substrate, ends of the groove portions being aligned on a virtual straight line as viewed in a direction perpendicular to a lamination direction,
the groove portions are formed such that a gap between arbitrary adjacent groove portions among the groove portions differs from a gap between different arbitrary adjacent groove portions among the groove portions,
a gap d between the one surface of the substrate and a bottom surface of each of the groove portions is equal to or larger than half the wavelength of the light to be propagated through the optical waveguide, and the optical waveguide has a curved portion curved from a straight portion, and the groove portions are disposed in a manner of intersecting a virtual extension line of the straight portion.

12. The optical circuit element according to claim 11, wherein the light absorption layer is formed such that the entirety of at least one of the groove portions is filled therewith.

13. The optical circuit element according to claim 11, wherein regarding the groove portions, four or more groove portions are formed in a manner of extending substantially parallel to each other, and
wherein the groove portions are formed such that a sum of the gap between arbitrary groove portions of the groove portions differs from a sum of the gap between different arbitrary groove portions of the groove portions.

14. The optical circuit element according to claim 11, wherein the groove portions are formed such that a width of an arbitrary groove portion of the groove portions differs from a width of an adjacent groove portion of the groove portions.

15. The optical circuit element according to claim 14, wherein regarding the groove portions, three or more groove portions are formed in a manner of extending substantially parallel to each other, and
wherein the groove portions are formed such that a sum of widths of arbitrary groove portions of the groove portions differs from a sum of widths of different arbitrary groove portions of the groove portions.

16. The optical circuit element according to claim 11, wherein the optical waveguide has a curved portion curved from a straight portion, and the groove portions are formed in a manner of being curved and extending along the curved portion.

17. The optical circuit element according claim 11, wherein the optical waveguide is a ridge type.

18. The optical circuit element according to claim 11, wherein the light absorption layer is formed of Si.

* * * * *